United States Patent [19]
Turner et al.

[11] 3,778,205
[45] Dec. 11, 1973

[54] APPARATUS FOR COOLING BLOWN POLYMER FILMS

[75] Inventors: Robert Burton Turner, Lake Jackson, Tex.; Emilio Lawrence Poli, Midland, Mich.

[73] Assignee: The Dow Chemical Company, Midland, Mich.

[22] Filed: June 11, 1970

[21] Appl. No.: 57,877

[52] U.S. Cl. .............................................. 425/71
[51] Int. Cl. ............................................ B29c 25/00
[58] Field of Search ................ 18/14 S; 425/326 R, 425/71

[56] References Cited
UNITED STATES PATENTS
3,035,302   5/1962   Lysobey ..................... 18/14 S UX
3,235,632   2/1966   Lemmer et al. ................. 18/14 S X FOREIGN PATENTS OR APPLICATIONS
853,745   6/1960   Great Britain ..................... 18/14 S Primary Examiner—H. A. Kilby, Jr.
Attorney—Griswold and Burdick and Robert B. Ingraham

[57] ABSTRACT

This invention relates to the cooling of blown polymer film by spraying a relatively low boiling point liquid onto the film, thereby causing cooling and solidification of the heat plastified polymer. The vaporized liquid coolant is condensed on the exterior wall of a cooling chamber which surrounds the blown film and the condensate is collected and re-cycled.

5 Claims, 2 Drawing Figures

PATENTED DEC 11 1973

3,778,205

INVENTORS.
Robert B. Turner
BY Emilo L. Poli
Griswold & Burdick
ATTORNEYS

APPARATUS FOR COOLING BLOWN POLYMER FILMS

This application is a divisional application of our copending U.S. Pat. application Ser. No. 738,884, filed June 21, 1968, now U.S. Pat. No. 3,576,929.

BACKGROUND OF THE INVENTION

This invention relates to a method and apparatus for the cooling of blown polymer film and, more particularly, to a method and apparatus for cooling thin gauge polymer film with a spray of a relatively low boiling point quick vaporizing liquid coolant.

Several methods are presently known for cooling blown polymer film. Some of these utilize a cooling mandrel while others consist of blown air or gas cooling means and still others pass the film through a water bath. It is characteristic that film cooled by the above-described and other similar processes sometimes does not possess the surface smoothness and film clarity obtained by spray cooling. The fast quench obtained by spray cooling most often improves the film clarity, increases the film strength and reduces surface roughness.

SUMMARY OF THE INVENTION

It is an object of the present invention to provide a method and apparatus for cooling of blown polymer film which in turn frequently enhances the physical properties of the resulting product.

A further object is to provide a method and apparatus for producing blown polymer film which has the desirable characteristics of clarity, smoothness and increased film strength.

A further benefit derived from the fast quench is a shortened distance between the extrusion die and bubble collapsing means, which reduces the overall length of a new installation of extruding and film wind-up apparatus or increases the output of existing equipment.

These and additional objects and cognate benefits and advantages are achieved in and by practice of the present invention which comprises an improvement in the method and apparatus for cooling thin gauge polymer film extruded by the bubble process.

After extruding the heat plastified polymeric material in the form of a tube, the tube is inflated and then collapsed at its end distal from the die to form a closed gas space. The improvement comprises a method of cooling the film within a closed housing defining a chamber arranged so as to provide a closed space surrounding the extruded tube. The housing defines end openings which are in sealing engagement with the extruded tube, and the tube whereby functions as an inner wall which further defines the chamber. The film is cooled by spraying it with a low boiling point liquid coolant as it leaves an extrusion die orifice. The coolant's boiling point must be below the temperature (135°–215° C) of the heat plastified polymer. As a spray device applies the liquid coolant, the coolant is carried upward by the moving film and undergoes a substantial amount of vaporization, thereby causing solidification and cooling of the film by heat transfer into the coolant. The vaporized coolant is then condensed and re-cycled through the spray device.

Also contemplated within the scope of the invention is an apparatus for cooling polymer film by the above-described method. The apparatus comprises a closed housing defining a cooling chamber and end openings. The housing is adapted to be positioned about a polymer film tube, with the end openings adapted to be in sliding sealing engagement with said tube. The extruded tube itself constitutes an inner wall which further defines the cooling chamber.

A liquid coolant spraying means is attached to a wall of the housing adjacent an extrusion die orifice. In order that the coolant might be re-cycled, a liquid receiving area is disposed in a bottom wall of the housing to receive condensed liquid coolant and is in operative combination with a circulating means adapted to forward coolant from the liquid receiving area to the spraying means.

BRIEF DESCRIPTION OF THE DRAWING

In the accompanying drawings wherein preferred embodiments of the invention are illustrated.

DESCRIPTION OF THE PREFERRED EMBODIMENTS

Figure 2:
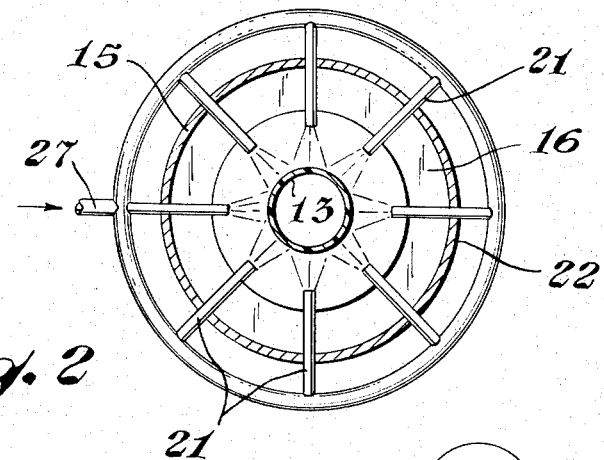
FIG. 2 is a top view of the spray device taken through line 2—2 of FIG. 1.
Figure 1:
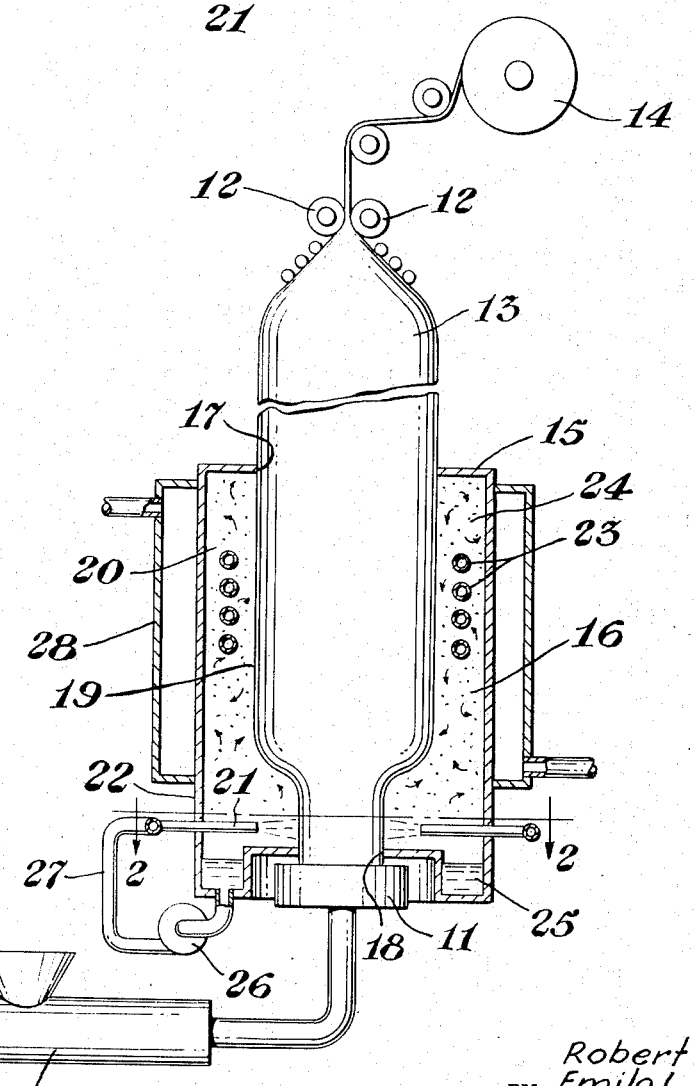
FIG. 1 is schematic cross-sectional representation of the entire extruder, cooling and film windup apparatus of the invention

In accordance with the present invention and referring to the apparatus illustrated in the drawings, the apparatus of FIGS. 1 and 2 consists of an extruder 10 of conventional construction having an upwardly extruding annular die 11. Sets of nip rolls 12 are spaced from the die 11 along the axis of generally vertically disposed upwardly extending radially distended extruded film tube 13. A film windup apparatus 14 is spaced from the nip rolls 12.

Means for cooling the extruded film tube 13 consist of a housing 15 defining an axially elongated toroidally shaped closed cooling chamber 16 with end openings 17, 18, in which the axis of the chamber 16 coincides with the axis of the extruded tube 13. The extruded tube 13 is disposed inside the housing 15 and forms an inner wall 19 which further defines an annular chamber 20. A spray device 21 is attached to an outer wall 22 of the housing 15 immediately above the face of the die 11. Positioning of condenser tubes 23 within the closed cooling chamber 16 provides more effective condensation of the vaporized coolant 24. A liquid receiving area 25 which is lower than any other point of the chamber 16 is disposed in a portion of the wall comprising the underside of the housing 15. A circulating means or liquid forwarding means 26 which beneficially is a centrifugal pump for recycling or circulating the coolant is disposed within a pipeline 27 which has one end attached to the liquid receiving area 25 and the opposite end attached to the spray device 21.

At times when maximum heat transfer is required, it is desirable to pass the condensed coolant through a heat exchanger (not shown) to further lower the temperature of the coolant. In addition heat exchangers 28 can jacket outer walls 22 of the housing 15 in order to lower the temperature of the surfaces on which the coolant vapors 24 are condensed.

The process of the invention may be applied to any thermoplastic polymer film. Liquids which are useful as coolants are those which have a boiling point not greater than the solidification point of the polymer and which do not detrimentally affect the film. Excellent coolants are low boiling point (35°–90° C) liquids such as methylene chloride, 1,1,1-trichloroethane, and trichloroethylene; refrigerants having boiling points in the 0°–25° C range, such as dichloromonofluoromethane, dichlorotetrafluoroethane, and trichloromonofluoromethane; and water.

As a portion of the coolant, one is able to apply agents which are useful in imparting desirable properties to the film other than clarity, strength and smoothness. Agents which are found to be useful in treating the blown film when used as a portion of the coolant media are surfactants, lubricants, slip agents, block agents, and the like. An example of a useful surface active agent is Benax 2A1. Chemically the product is dodecyldiphenyl ether disulfonic acid, sodium salt, and is an anionic surface active agent.

As is apparent from the foregoing specification, the present invention is susceptible of being embodied with various modifications which may differ particularly from those which have been described in the preceeding specification and description. For this reason it is to be fully understood that all of the foregoing is intended to be merely illustrative and is not to be construed or interpreted as being restrictive or otherwise limiting of the present invention.

What is claimed is:

1. An apparatus for cooling polymer film prepared by the trapped bubble process, wherein a polymer tube is extruded from a die and radially distended to form a blown polymer film in tubular form, the apparatus comprising
   a closed housing defining
      a cooling chamber and end openings, said housing adapted to be positioned about the blown polymer film tube with the end openings adapted to be in sliding sealing engagement with said film tube, wherein the film tube itself constitutes an inner wall which further defines the chamber,
   a liquid coolant spraying means attached to a wall of the housing adjacent an extrusion die orifice,
   a liquid condensing means,
   a liquid receiving area in a bottom wall of the housing to receive condensed liquid coolant, and
   a circulating means adapted to forward coolant from the liquid receiving area to the spraying means.

2. The apparatus of claim 1 wherein the cooling chamber defined by the closed housing is generally annular in shape.

3. The apparatus of claim 1 wherein said cooling chamber contains heat exchange conduit members.

4. The apparatus of claim 1 wherein exterior walls of the housing are in operative combination with a heat exchanger adapted to remove heat from the housing exterior wall.

5. An apparatus for cooling blown polymer film prepared by the trapped bubble process comprising in cooperative combination
   an extruder having
      an upwardly extruding annular die for extruding polymeric material in the form of a tube,
   sets of nip rolls spaced from the die along the axis of the tube for collapsing and closing an end of the tube distal from the die, thereby forming a closed gas space,
   a film wind-up apparatus spaced from the nip rolls and means for cooling said film comprising
   a closed housing defining
      a cooling chamber and end openings, said housing adapted to be positioned about a radially distended polymer film tube with the end openings adapted to be in sliding sealing engagement with said tube, wherein the tube itself constitutes an inner wall which further defines the chamber,
   a liquid coolant spraying means attached to a wall of the housing adjacent an extrusion die orifice,
   heat exchange conduit members disposed within the cooling chamber,
   a liquid receiving area in a bottom wall of the housing to receive condensed liquid coolant and
   a circulating meand adapted to forward coolant from the liquid receiving area to the spraying means.

* * * * *